US008585504B2

(12) United States Patent
Byng

(10) Patent No.: US 8,585,504 B2
(45) **Date of Patent: *Nov. 19, 2013**

(54) GAMING SYSTEM

(75) Inventor: Stephen Byng, Lane Cove (AU)

(73) Assignee: Aristocrat Technologies Australia Pty Ltd (AU)

( * ) Notice: Subject to any disclaimer, the term of this patent is extended or adjusted under 35 U.S.C. 154(b) by 371 days.

This patent is subject to a terminal disclaimer.

(21) Appl. No.: 12/884,445

(22) Filed: Sep. 17, 2010

(65) Prior Publication Data

US 2011/0009184 A1 Jan. 13, 2011

Related U.S. Application Data

(63) Continuation of application No. 11/748,986, filed on May 15, 2007.

(30) Foreign Application Priority Data

May 15, 2006 (AU) ................................ 2006902577

(51) Int. Cl.
*A63F 13/00* (2006.01)

(52) U.S. Cl.
USPC ............................................................ 463/42

(58) Field of Classification Search
USPC ......................................... 463/16–20, 40–42
See application file for complete search history.

(56) References Cited

U.S. PATENT DOCUMENTS 6,743,102 B1 * 6/2004 Fiechter et al. ................. 463/42
2003/0064807 A1 * 4/2003 Walker et al. ................... 463/42
2006/0121971 A1 * 6/2006 Slomiany et al. ............... 463/16
2006/0211479 A1 * 9/2006 Walker et al. .................. 463/16

* cited by examiner

*Primary Examiner* — David L Lewis
*Assistant Examiner* — Eric M Thomas
(74) *Attorney, Agent, or Firm* — McAndrews, Held & Malloy, Ltd.

(57) ABSTRACT

A method of operating a gaming system including a plurality of gaming machines and at least one server system. The method includes providing at least a first gaming service to each gaming machine by way of one or more first software processes and providing at least one second service common to a subset of the plurality of gaming machines, the second service implemented by one or more second software processes. The method also includes enabling inter-process interaction between at least one software process of the first service and at least one software process of the second service to enable interaction between the services. A server system, gaming machine and gaming system is also disclosed.

17 Claims, 7 Drawing Sheets

GAMING SYSTEM

RELATED APPLICATIONS

This application is a continuation of co-pending U.S. application Ser. No. 11/748,986, filed May 15, 2007 and is related to and claims priority from Australian patent application filed on May 15, 2006, as serial number AU2006902577, entitled "Gaming System" which is herein incorporated by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to gaming machines and apparatus and methods of gaming. In particular, the present invention relates to gaming systems having a plurality of linked gaming apparatuses.

With the increase of gambling at gaming venues has come increased competition between gaming venues to obtain a larger share of the total gambling spend. Gaming venue operators have therefore continuously looked for new variations and types of games in order to attract both new and return customers to their venues.

In response to this need, suppliers of gaming devices and systems have attempted to provide the sought after variety, while still developing games that comply with the relevant regulations in the jurisdiction of the gaming venue operator. Suppliers of gaming devices therefore are faced with restrictions on the types of games and gaming apparatus that are allowable, both in terms of the prevailing regulations and in terms of providing a return on investment to the gaming venue operators.

Casinos and other gaming venues, such as hotels and clubs, can operate hundreds or thousands of gaming machines The vast majority of these gaming machines will be arranged in an area, e.g. a floor or part of a floor, of the casino (or establishment) that is dedicated to the operation of gaming machines. Machines in such areas may be arranged in groups on the floor by game type, denomination, or theme etc. to increase player interest. Moreover, progressive or linked jackpots and tournament games can also be used to increase player interest, and excitement. As a result of this type of concentration and arrangement of gaming machines, there might be hundreds or thousands of players playing in the same casino, or on the same floor or the casino, at the one time.

However, even though there are such large numbers of people together, who are engaged in a common pursuit, the present inventors have determined that there is typically little, if any, interaction between players, other than talking between players of adjacent gaming machines.

The present inventors have therefore determined that player interest and excitement might be enhanced further if the level of interaction between players can be increased.

Any reference in this specification to the prior art does not constitute an admission that such prior art was well known or forms part of the common general knowledge in any jurisdiction.

BRIEF SUMMARY OF THE INVENTION

In a first aspect, the present invention provides a method of operating a gaming system including a plurality of gaming machines and at least one server system, the method including providing at least a first gaming service to each gaming machine, the first gaming services implemented by way of one or more first software processes; and providing at least one second service common to a subset of the plurality of gaming machines, the second service implemented by one or more second software processes; and enabling inter-process interaction between at least one software process of the first service and at least one software process of the second service to enable interaction between the services.

The inter-process interaction can be made by direct communication between processes or via indirect means.

Preferably the first services include one or more game services. More preferably, the second service implements a game feature interacting with a plurality of gaming machines.

In one form the indirect interaction between a process of a first service and a process of a second service includes: a process of one of the services storing process related data in a memory means accessibly by another process.

The method can farther include causing the second service to interact with the subject of gaming machines upon the occurrence of a predetermined trigger condition.

In a second aspect, the present invention provides a gaming system including a plurality of gaming machines communicatively coupled to at least one server system, which is configured to provide game services to a plurality of gaming machines, said services being implemented by one or more game processes, wherein the server system is further configured to provide at least one second gaming service that implements a shared service to a subset of the plurality of said gaming machines, the second service being implemented by one or more software processes.

In a preferred form, one or more of the game processes configured to provide a game service to a gaming machine is configured to interact with a software process forming part of the second game service, to allow inter-service interaction between the services.

Preferably the interaction between the first game services and the second game service is performed in the server system.

In a particularly preferred form the one or more game processes are configured to cause predetermined game process data to be stored in a memory location accessible by the second game process. Most preferably the second game process is configured to monitor such stored game process data intermittently.

In a preferred form the second game service is configured to implement a shared gaming experience in respect of a plurality of gaming machines upon detection of a trigger condition.

The second service can detect said trigger condition from the game process data stored in the accessible memory location by the first game process.

A gaming machine of the system can be configured to run a game client configured to interact with one or more servers to implement the gaming service in respect of that gaming machine. It is also possible for the gaming machine to run at least one second client, interoperable with a second gaming server to implement a second gaming service. In such a case, interaction between a first game service in respect of a gaming machine and the second game service can be performed by interaction between corresponding clients residing on a gaming machine.

One or more gaming machines may also be provided with access to a player communications service implemented by one or more software processes on the server system. The player communication service can be implemented as part of the second gaming service. Alternatively, the player communication service may be implemented as a dedicated service.

In a third aspect, the present invention provides a gaming machine network including a plurality of gaming machines, each gaming machine having access to a corresponding game service, and wherein at least a subset of the gaming machines are provided with a second game service shared with each of the members of a subset of the gaming machines. The initiation of the second game service may be triggered by the occurrence of a predetermined plurality of trigger conditions occurring in a respective game service of each gaming machines in the subset.

In one form the plurality of trigger conditions are the same trigger condition. Alternatively, the plurality of trigger conditions may include different trigger conditions.

In a first form, the second game service provided to the subset of gaming machines provides a single game played by the subset of gaming machines, and the outcome of the second game is determined by reference to at least part of an outcome of a game implemented by the respective first game service to the plurality of gaming machines forming the subset. In this regard, the plurality of gaming services whose at least partial result is used to determine the outcome of the second game service can relate to the same game. Alternatively they may relate to different games.

In one embodiment the outcome of the second game service is determined on the basis of the whole outcome of the games implemented by the respective game services of the subset of gaming machines.

In a particularly preferred form the first gaming service is provided to the gaming machine are spinning reel games. In this case the second game server may also implement a spinning reel game whose outcome is determined on the basis of the outcome of at least one reel from a plurality of gaming machines. In one form the second game service may have its outcome determined on the basis of the outcome from all of the reels of each of the plurality of combined gaming machines.

In a fourth aspect, the present invention resides in a gaming system including:

a plurality of gaming machines, each of which implement one or more terminal client processes, at least one of the terminal client processes implementing at least one game played on the gaming machine; and a server system communicatively coupled to the plurality of gaming machines, the server system including one or more servers running a plurality of server processes including one game server process for each of the terminal client processes and a single promotional server process for the terminal client processes, and data storage;

wherein the game server processes receive or generate, and store in the data storage game data relating to the running of the terminal client processes and an identifier associated with the game data, and the promotional server process implements an interactive game in cooperation with the one or more terminal client processes and during implementation of the interactive game reads game data stored in the data storage by a subset of said game server processes and forms an outcome of the interactive game by combining the read game data.

The promotional server may implement the interactive game in response to the occurrence of a trigger event and wherein the promotional server determines whether the trigger event has occurred from game data stored in the data storage by the game server processes.

The terminal client processes may comprise a game client process that implements a game on the gaming machine and a promotional client process that implements the interactive game in cooperation with the promotional server process, and wherein the game client processes each push said game data to its associated promotional client process, which then communicates the game data to the promotional sever process in the server system.

In a fifth aspect, the present invention resides in a gaming system including:

a plurality of gaming machines, each of which implement a game client process and a promotional client process, wherein the game client process implements a game that is played on the gaming machine and pushes game data related to play of the game to the promotional client process; and a server system communicatively coupled to the plurality of gaming machines, the server system including one or more servers running a plurality of server processes including one game server process for each of the terminal client processes and a single promotional server process for the promotional client processes;

wherein the game server processes generate and/or receive from the game client processes game, data relating to the running of the game client processes on the gaming machines and an identifier associated with the game data, wherein the promotional client processes send game data received from their respective game client processes to the promotional server process; and wherein the promotional server process implements an interactive game by receiving game data defining at least a partial game outcome from the promotional client processes and forming a combined game outcome from the received data.

The promotional server may implement the interactive game on the occurrence of a trigger event and wherein the promotional server determines when the trigger event occurs from the game data received from the promotional client.

The promotional server may be arranged to select from said game data an event related to play of the game or interactive game and replay the event on one or more displays in the gaming system.

The promotional sever may facilitate player to player communication between two or more players each located at one of the plurality of gaming machines. The promotional server may facilitate one said player to replay a said game event at one of the gaming machines on the request of a player at another gaming machine.

In a sixth aspect, the present invention provides a gaming system including:

a plurality of gaming machines, each of which implement one or more terminal client processes including a game client process that implements at least one game played on the gaming machine; and a server system communicatively coupled to the plurality of gaming machines, the server system including one or more servers running a plurality of server processes including one game server process for each of the terminal client processes and a single promotional server process for the terminal client processes, and data storage;

wherein the gaming system causes inter-process interaction to occur between at least one of the game server process and game client process and the promotional server process, either directly, or through a said terminal client process distinct from the game client process.

Further aspects of the present invention and further embodiments of the aspects of the invention described in the preceding paragraphs will become apparent from the following description, given by way of example and with reference to the accompanying drawings.

In the present specification the phrase "software process" should be understood to include data processing threads or data processing that takes place by the use of a virtual machine or other software configured data processing means. The terms "service" should be understood to be any software implemented function the provision of software applications or instruction or instructions and/or data needed to implement a function or outcome of such a function that is provided to a component of the gaming system by a processing resource of the gaming system.

BRIEF DESCRIPTION OF SEVERAL VIEWS OF THE DRAWINGS

Notwithstanding any other embodiments that may fall within the scope of the present invention, certain embodiments of the present invention will now be described, by way of example only, with reference to the accompanying figures, in which.

DETAILED DESCRIPTION OF THE INVENTION

Figure 1:
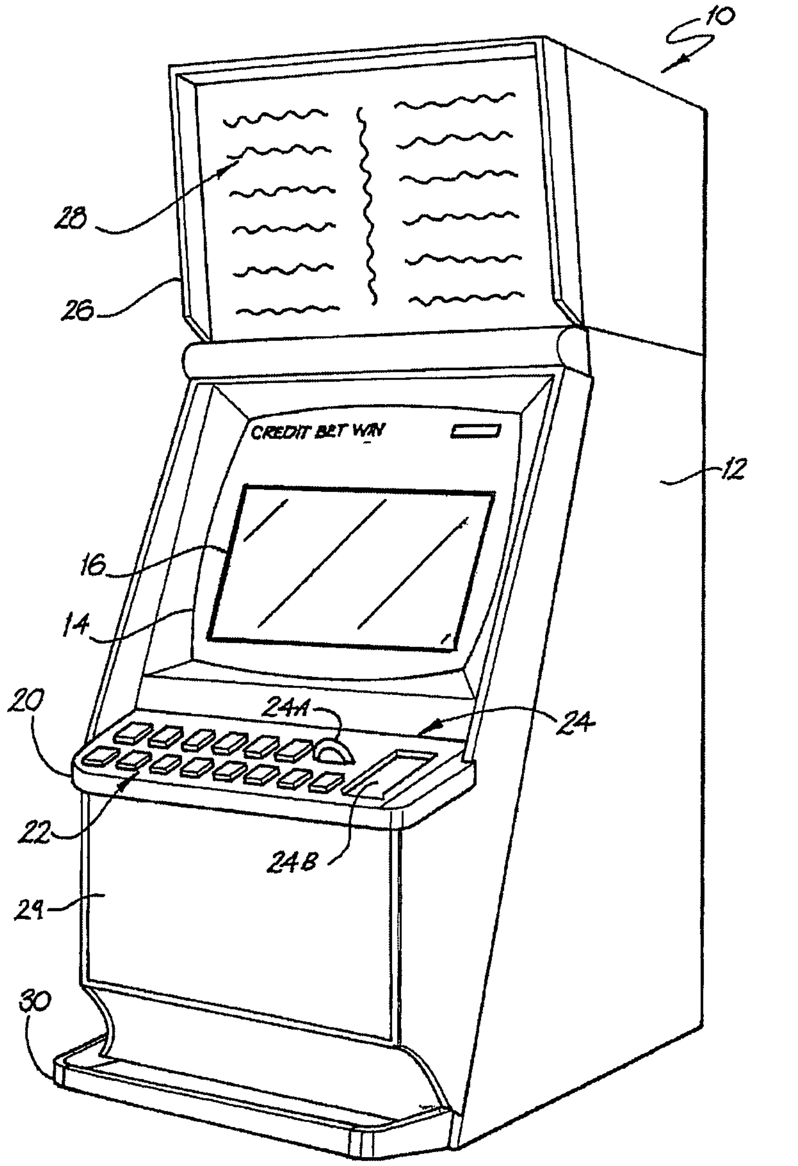
FIG. 1 shows diagrammatically, a view of a gaming machine suitable for implementing an embodiment of the present invention.

In FIG. 1 of the accompanying drawings, a gaming machine suitable for implementing an embodiment of the present invention is generally referenced by arrow 10. The gaming machine 10 is one example of a gaming apparatus that is suitable to implement an embodiment of the present invention.

The gaming machine 10 includes a console 12 having a display 14 on which is displayed representations of a game 16, that can be played by a player. A mid-trim 20 of the gaming machine 10 houses a bank of buttons 22 for enabling a player to play the game 16. The mid-trim 20 also houses a credit input mechanism 24 including a coin input chute 24A and a bill collector 24B. A top box 26 may carry artwork 28, including for example, pay tables and details of bonus awards and other information or images relating to the game. Further artwork and/or information may be provided on the front panel 29 of the console 12. A coin tray 30 is mounted beneath the console 12 for cash payouts from the gaming machine 10.

The display 14 shown in FIG. 1 is in the form of a video display unit, particularly a cathode ray tube screen device. Alternatively, the display 14 may be a liquid crystal display, plasma screen, any other suitable video display unit, or the visible portion of an electromechanical device. In this latter respect, if the game 16 is a spinning reel game, the display 14 may use a stepper motor to control the position of physical reels. The top box 26 may also be a display, for example a video display unit, which may be the same type as the display 14, or a different type of display.

Figure 2:
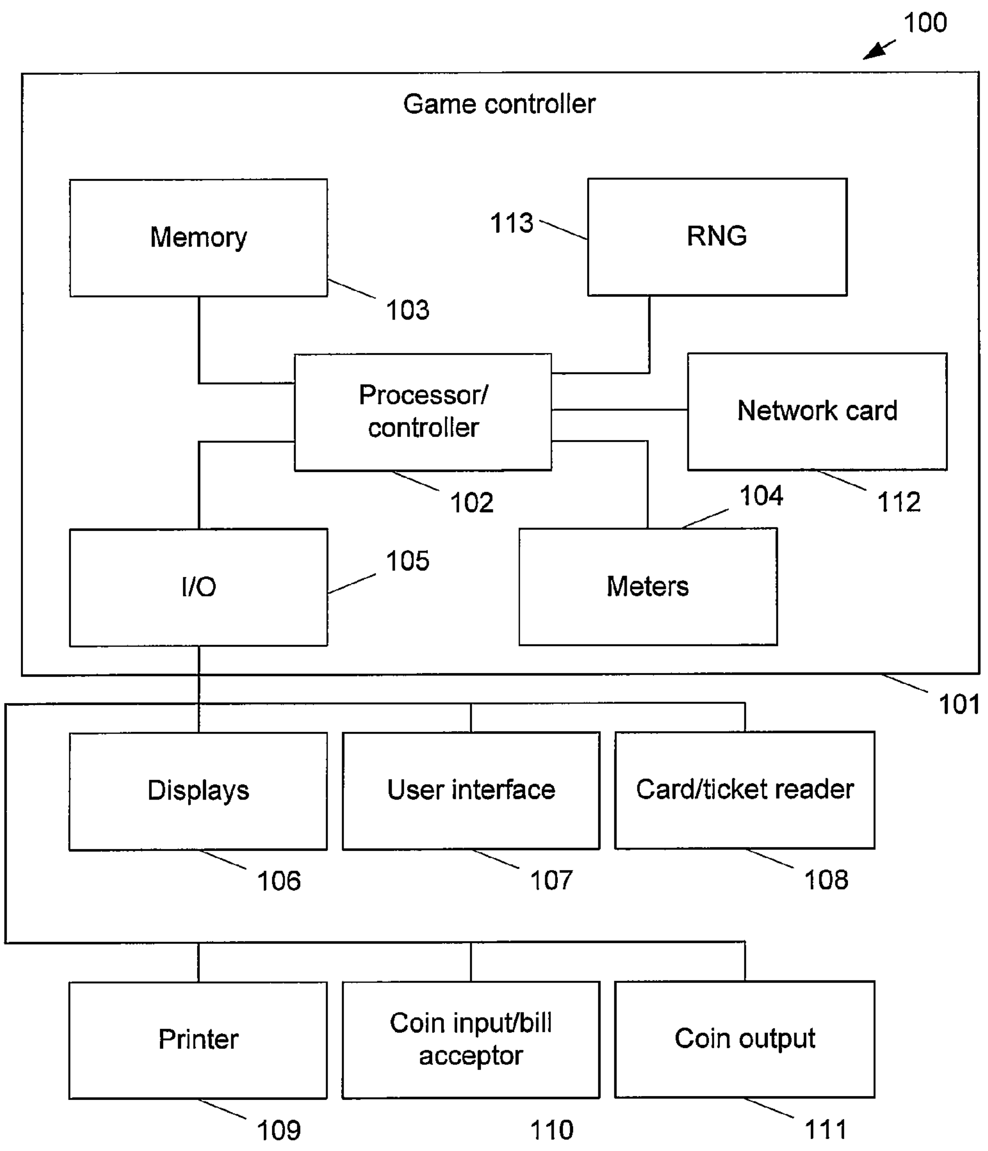
FIG. 2 shows a block diagram of gaming apparatus suitable for implementing an embodiment of the present invention.

FIG. 2 shows a block diagram of a gaming apparatus such as that depicted in FIG. 1, generally referenced by arrow 100. The gaming apparatus 100 preferably operates as a networked gaming machine, communicating with other network devices, such as one or more servers or other gaming machines. The gaming apparatus 100 may have distributed hardware and software components that communicate with each other directly or through a network. Accordingly, different reference numerals have been used in FIG. 2 from FIG. 1 for components that may be equivalent.

The gaming apparatus 100 includes a game controller 101, which in the illustrated example includes a microprocessor, microcontroller, programmable logic device or other computational device 102. Instructions and data to control operation of the computational device 102 are stored in a memory 103, which is in data communication with the computational device 102. Typically, the gaming apparatus 100 will include both volatile and non-volatile memory and more than one of each type of memory, with such memories being collectively represented by the memory 103, which is further described in connection with FIG. 3. In addition, the computational device 102 may include two or more computational devices that each perform computational functions and which may be located locally or remotely from each other. The instructions to cause the game controller 101 to implement an embodiment of the present invention will be stored in the memory 103.

The gaming apparatus may include meters 104 for the purposes of regulatory compliance and also include an input/output (110) interface 105 for communicating with the peripheral devices of the gaming apparatus 100. The input/output interface 105 and/or the peripheral devices may be intelligent devices with their own memory for instructions and data.

In the example shown in FIG. 2, the peripheral devices that communicate with the controller are one or more displays 106, user interfaces 107, a card and/or ticket reader 108, a printer 109, a bill acceptor and/or coin input mechanism 110 and a coin output mechanism 111. Additional devices may be included in the gaming apparatus 100 or devices omitted as required.

In addition, the gaming apparatus 100 includes a communications interface, for example a network card 112, to communicate with a network. The network may be a type depicted in FIG. 4, and may typically include a server system for providing services to the gaming apparatus 100, and other gaming machines. The network can also be used by the apparatus 100 for such purposes as sending status information, accounting information and the like to a central controller, allowing communication from the central controller to the gaming apparatus 100 or for other purposes. In one embodiment, the functions of the computational device 102 may be split between a remote device and a local device, for example with game outcomes generated remotely by a server system and game graphics for the display 106 generated locally. In a client process in another embodiment, the peripheral devices only may be provided locally together with a network interface, in which case all, or nearly all intelligent devices may be located remotely of the display 106.

Figure 3:
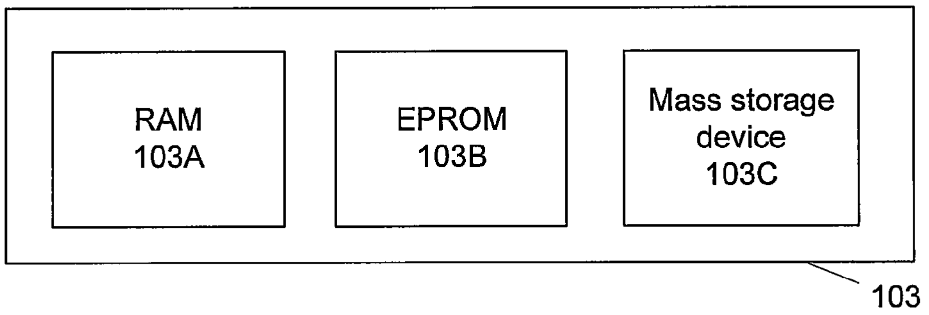
FIG. 3 shows a block diagram of components of the memory of the gaming apparatus represented in FIG. 2.

FIG. 3 shows a block diagram of the main components of the memory 103 of the gaming apparatus 100 depicted in FIG. 2. The RAM 103A typically holds program files and data for execution by the computational controller 102. The EPROM 103B may be a boot ROM device and/or may contain some system or game related code. The mass storage device 103C is typically used to store game programs, the integrity of which may be verified and/or authenticated by the computational controller 102 using protected code from the EPROM 103B or elsewhere. Those skilled in the relevant arts will appreciate that alternative possibilities exist for the location of code and data.

Figure 4:
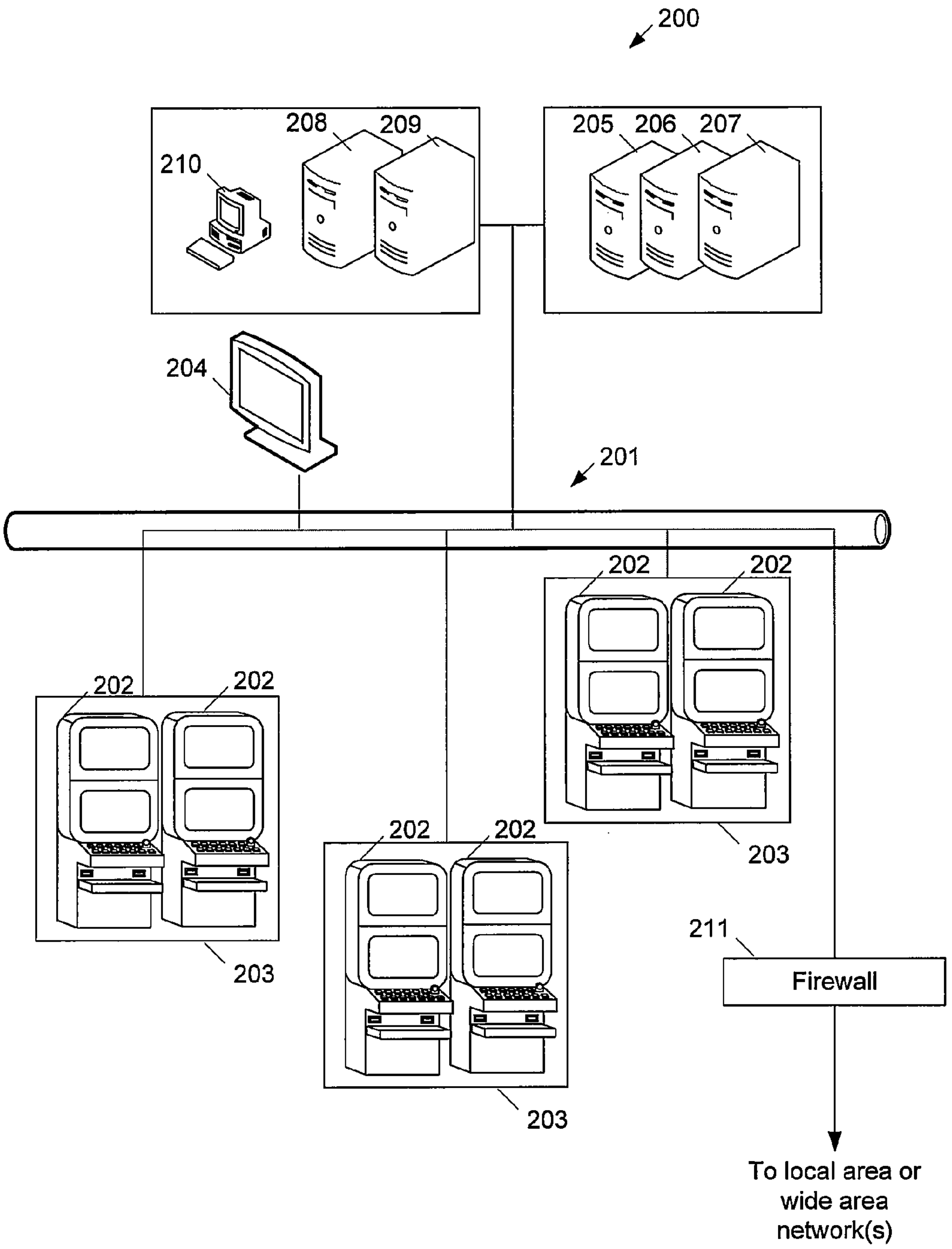
FIG. 4 shows diagrammatically, a network gaming system suitable for implementing an embodiment of the present invention.

FIG. 4 shows a gaming system 200. The gaming system 200 includes a network 201, which for example may be an Ethernet network. Gaming devices 202, shown arranged in three banks 203 of two gaming devices 202 in FIG. 4, are connected to the network 201. The gaming devices 202 may be gaming machines 10, as shown in FIG. 1 or form part or all of another gaming apparatus 100. Single gaming devices 202 and banks 203 containing three or more gaming devices 202 may also be connected to the network 201.

One or more displays 204 may also be connected to the network 201. The displays 204 may, for example, be associated with a bank 203 of gaming devices. The displays 204 may be used to display representations associated with game play on the gaming devices 202, and/or used to display other representations, for example promotional or informational material.

A server system including one or more servers is also connected to the network 201. For example, a game server 205 may generate game outcomes for games played on the gaming devices 202, a database management server 206 may store game programs and associated data for downloading or access by the gaming devices 202 and a jackpot server 207 may control one or more jackpots associated with the gaming devices 202. Further servers may be provided to assist in the administration of the gaming system 200, including for example a gaming floor management server 208, and a licensing server 209 to monitor the use of licenses to particular games. An administrator terminal 210 is provided to allow an administrator to run the network 201 and the devices connected to the network. The different servers mentioned above may each take the form of a distinct physical server (as depicted) or be implemented in a virtual form as "server processes" running on shared physical services.

The gaming system 200 may communicate with other gaming systems, other local networks, for example a corporate network and/or a wide area network such as the Internet through a firewall 211.

Broadly, certain embodiments of the present invention provide systems and methods for providing game features that are playable by a plurality of players together. For convenience 30 such game features will be referred to herein as "super-games".

The illustrative embodiments described herein each relate to the gaming system in which each gaming machine is configured to play a spinning reel game which includes five spinning reels. Similarly, the super-games described herein are also spinning reel games. However, it should be noted that embodiments of the present invention should not be considered limited to spinning reel games, but can be applied to a range of other game types, as will be appreciated by those skilled in the art.

In certain embodiments of the invention the plurality of players using respective gaming machines will take part in the super-game in a cooperative fashion, i.e. the individuals are not playing against other but are rather playing together as a team, in the one game to the benefit of the entire team. However "super-games" could be devised in which players play against each other, either alone or in teams.

Figure 5:
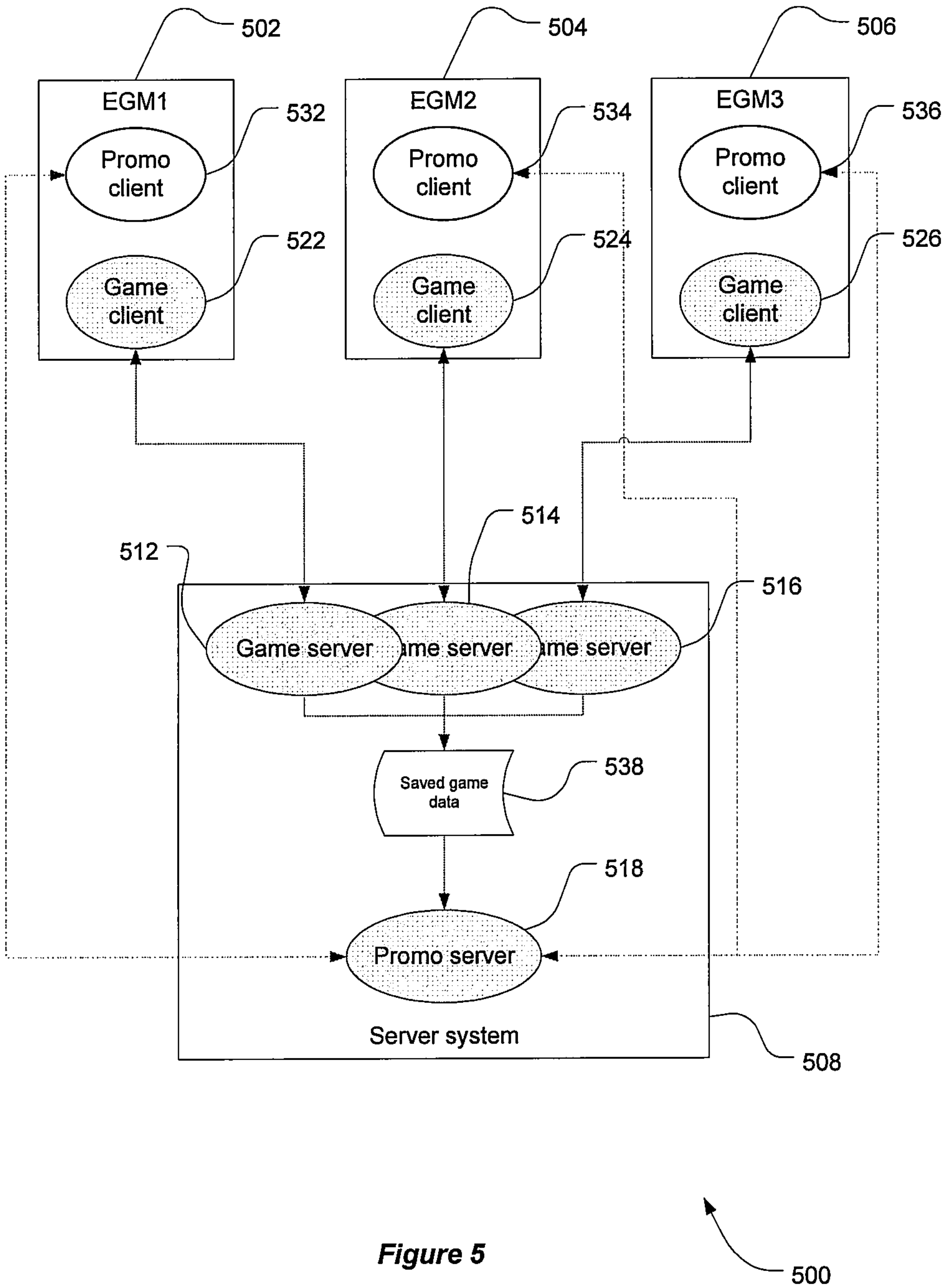
FIG. 5 shows a schematic diagram of software processes and data used in an embodiment of the present invention.

Turning now to FIG. 5, which depicts software elements and logical connections between those elements, along with related stored data, in a gaming system configured to implement an embodiment of the present invention. The system 500 includes three gaming machines 502, 504 and 506 and a server system 508. A greater number of gaming machines or server systems could be used in an implementation of an embodiment the present invention, however for simplicity only three gaming machines and a single server system are illustrated. The gaming machines 502, 504 and 506 are in data communication with the server system 508 via a network, for example as illustrated in FIG. 4.

Turning firstly to the server system 508, which runs one or more software processes which provide game services to the gaming machines. In this case, the server system 508 is running three game servers 512, 514, and 516. Each game process interacts with the corresponding game client in one of the gaming machines to provide a gaming service to that machine. For example, games server 512 provides a game service to gaming machine 502 and game server 514 provides a gaming service to gaming machine 504 and game server 516 provides a gaming service to gaming machine 506. The server system 508 also runs a promotional server 518 which is configured to implement and control a super-game which can be played on a plurality of the gaming machines 502, 504 and 506.

Turning now to the gaming machines 502, 504 and 506 each gaming machine runs a game client process, 522, 524 and 526 respectively. They are also configured to run a promo client process 532, 534 and 536 respectively. The promo client processes may only be run from time to time when the promotional server 518 determines that the super-game is to be activated, or alternatively may be run on a permanent basis. In alternative embodiments, the promo client and game client may be combined into a single terminal client which is configured to implement all client—side functions of the gaming machine.

In use, the promotional server 518, has the role of triggering and controlling a super-game which can be participated in by a number of gaming machines Preferably a super-game will be run simultaneously or substantially simultaneously with an underlying game being played on the gaming machines, and in certain embodiments the outcome of the super-game will depend at least in part upon the outcome of the underlying game on each gaming machine. Therefore interaction between the promotional server 518 and each of the game servers 512, 514 or 516 is provided.

In this first embodiment each of the gaming server processes 512, 514 and 516 has been designed to save predetermined game data into data storage 538, which is also accessible by the promotional server 518. In a preferred form the data storage 538 is a data storage means dedicated to this use. In alternative forms the data storage 538 may serve a dual role as a game log however, this is not ideal as the database that is used for storing game logs, when provided, may be essential to the reliability of the system. Preferably therefore, any log database is maintained separately from the game data store so that the frequent accessing of the game data database by the promotional server does not impact this critical system requirement.

In practice, when the game server programs are created, "events of interest", which may be used to trigger a super-game, can be defined. Each time one of these events of interest occurs, data relating to that event of interest will be reported by the game server to the data storage 538. For example, a game server process might be configured to store information, such as the outcome of each game, reel strip positions at the start and end of the game, the payout in respect of the game, the identity of the player that triggered the game event or the identity of the gaming machine in which the gaming event was played. The stored data is then accessible by the promo client for triggering and controlling "super-games".

The promotional server 518 is configured to monitor the data stored in the data storage 538 and compare the stored data to one or more predefined triggering conditions which are used to start a super-game feature. For example, the promotional server 518 may monitor the stored data for particular feature triggers, specific win combinations or specific reel positions and use one or more of these (or other) events to trigger a super-game.

In a preferred embodiment the promotional server 518 will require a plurality of super-game triggers to occur within a predetermined time period in order to trigger a super-game. It is most preferable that each of the plurality of triggers occurs in respect of a different gaming machine within the gaming machine network. The participants in the super-game will then be defined by reference to the gaming machines where individual trigger conditions combine to trigger the super-game.

In certain embodiments of the present invention the triggering of the super-game or other second level event, is contingent upon the earlier triggering of two or more triggers occurring in respect of one or more gaming machines, which may be referred to as first level events. In some forms the two first level events are only able to be triggered on different ones (or groups of gaming machines). Thus the trigger of the second level event is conditional upon the earlier first level triggering events.

From a mathematical perspective, events such as super-games, jackpots, features and wins are triggered according to the probability of an event occurring P(Ex). But if events must be combined to trigger an event, conditional probability theory states:

$$P(E1E2)=P(E1)\times P(E2) \text{ for independent events.}$$

Hence the magnitude of the probability of the single "second level" event can be determined by the probability of the two separate first level events (with higher magnitude of probability of occurring).

If the number of players playing linked gaming machines is equal to "n" and the players are able to generate one event within the allotted time "t", then (n) events are generated. If event 1 (i.e. one of the first level triggering events) has a probability of occurrence of P(E1), then the probability that the next event is the required Event 2 (i.e. another predetermined first level triggering events) is:

$$P(Ex)=P(E1)\times P(E2)$$

The probability that any one of the players generates the required Event is:

$$P(Ex)=(PE1)\times(n-1)P(E2).$$

Hence to generate two events with the equivalent probability of P(Ex) is:

$$P(Ex)=(n-1)\times(PE1)\times P(E2).$$

If we are to award an equal prize (for simplicity and fairness) then the participants may be required to generate a first level triggering event with equal probability, i.e. P(E1)=P(E2). Hence the required probability of the events being generated by the players is proportional to the number of players and the required probability. The required probability for any two players to trigger the two required first level events (to cause a second level triggering event) from "n" total players is:

$$P(Ex)=(n-1)\times(PE1)\times P(E1)$$

$$P(E1)=\text{Square root}(P(Ex)/n-1).$$

In the case where the regulators require that the "Return to Player" is fair. The contribution of each possible win can be represented as the probability of the win and the award amount, as follows:

$$\text{RTP}(x)=P(Ex)\times\text{Award}(x),$$

$$P(Ex)=\text{RTP}(x)/\text{Award}(x)$$

or $$\text{Award}(x)=\text{RTP}(x)/P(Ex)$$

If we are substituting the conditional triggers for the general trigger, then the RTP contribution should be the same and hence:

$$\text{RTP}(x)=\text{RTP}(1)+\text{RTP}(2)$$

when the second level event is triggered by two players.

The award to each player due to wins triggered by conditional probability is then:

$$\text{RTP}(x)=P(Ex)\times\text{Award}(x)=P(E1)\times\text{Award}(1)+P(E2)\times\text{Award}(2)$$

Again, assuming fair and equal rewards:

$$P(Ex)\times\text{Award}(x)=P(E1)\times\text{Award}(1)+P(E1)\times\text{Award}(1)$$

$$P(Ex)\times\text{Award}(x)=2\times P(E1)\times\text{Award}(1)$$

The award to each player can therefore be determined as a function of the non-conditional award, as follows:

$$\text{Award}(1)=\text{Award}(x)\times P(Ex)/(2\times P(E1))$$

If we just want to get a feel for the magnitude of the relationship in a two player scenario where only two players are playing to trigger the second level award:

$$P(E1)=\text{Square root}(P(Ex))$$

$$\text{Award}(1)=\text{Award}(x)\times P(Ex)/(2\times\text{Square root}(P(Ex)))$$

So the award allocated to two players as a fraction of the traditional award is:

$$\text{Award}(1)/\text{Award}(x)=\text{Square root}(P(Ex))/2$$

If one wants to determine the award as a function of the number of players:

$$\text{Award}(1)=\text{Award}(x)\times(P(Ex)/(2\times P(E1))$$

$$\text{Award}(1)=\text{Award}(x)\times(n-1)\times P(E1)\hat{}\hat{}2/(2\times P(E1))$$

$$\text{Award}(1)=\text{Award}(x)\times(n-1)\times P(E1)/2$$

So in a many player environment the following equations can be presented:

$$P(E1)=\text{Square root}[P(Ex)/n-1] \quad \text{Equation 1}$$

$$\text{Award}(1)=\text{Award}(x)\times(n-1)\times P(E1)/2 \quad \text{Equation 2}$$

These equations imply two key concepts.

1) As the number of player attempting to achieve the condition increases, the probability of the event that they are attempting to achieve decreases. In other words the event becomes harder to achieve.

2) As the number of player attempting to achieve the condition increases, the amount awarded to the players increases.

A similar scenario arises when considering multiplayer cooperative triggers. In this case second level events, e.g. super-games, jackpots, features and wins are triggered according to the probability of an event occurring P(Ex). But conditional probability theory states: P(E1 E2)=P(E1)×P(E2) for independent events, that is the probability of occurrence of a combined second event P(E1 E2) occurring is the product of the probabilities occurrence of it contributing first level events. Hence it is feasible that the magnitude of the probability of a single event can be determined by the probability of two consecutive separate events (with higher magnitude of probability).

If the number of players playing is equal to "n" and the players are able to generate one event within the allotted time "t", then (n) events are generated.

Therefore if event 1 has a probability of occurrence of P(E1), then the probability that the next event is the required Event is:

$$P(Ex)=P(E1)\times P(E2)P(Em)$$

The probability that any "m" of the "n" players generates the required Event is:

$$P(Ex)=(PE1)\times(n-1)P(E2)\times(n-2)P(E3)(n-m+1)P(Em)$$

If we are to award an equal prize to each contributor to the award of the combined prize (for simplicity) then the participants must be required to generate an event with equal probability:

$$P(E1)=P(E2)\ \ldots\ =P(Em)$$

It should be noted that (n−1)×(n−2)× . . . (n−m+1) is the number of permutations of n−1 objects taken m at a time and is denoted as ${}^{n-1}P_m$.

The required probability for any "m" player from "n" total players to trigger an event is:

$$P(Ex)={}^{n-1}P_m\times(PE1)^{\wedge\wedge}m.$$

$$P(E1)=[(P(Ex)/{}^{n-1}P_m]^{\wedge\wedge}1/m$$

Again, in the scenario that the regulators require that the "Return to Player" is fair. The contribution of each possible win is represented as the probability of the win and the award amount.

$$\mathrm{RTP}(x)=P(Ex)\times\mathrm{Award}(x)$$

$$P(Ex)=\mathrm{RTP}(x)/\mathrm{Award}(x)$$

Or $$\mathrm{Award}(x)=\mathrm{RTP}(x)/P(Ex)$$

Then if one substitutes the conditional triggers for the general trigger then the RTP contribution should be the same and hence for the general case where "m" players from "n" possible players achieve the trigger condition the:

$$\mathrm{RTP}(x)=\mathrm{RTP}(1)+\mathrm{RTP}(2)+\ \ldots\ \mathrm{RTP}(m)$$

In this case, the award to each player due to wins triggered by conditional probability is:

$$\mathrm{RTP}(x)=P(Ex)\times\mathrm{Award}(x)=P(E1)\times\mathrm{Award}(1)+P(E2)\times\mathrm{Award}(2)+P(Em)\times\mathrm{Award}(m).$$

Again, assuming fair and equal rewards i.e. P(Ex)×Award (x)=m×P(E1)×Award(1).

Now determining the award to each player as a function of the non conditional award for the general case where "m" players from "n" possible players achieve the trigger condition the:

$$P(Ex)\times\mathrm{Award}(x)=m\times P(E1)\times\mathrm{Award}(1)$$

$$\mathrm{Award}(1)=\mathrm{Award}(x)\times P(Ex)/(m\times P(E1))$$

If one wants to determine the award as a function of the number of players:

$$\mathrm{Award}(1)=\mathrm{Award}(x)\times P(Ex)/(m\times P(E1))$$

$$\mathrm{Award}(1)=\mathrm{Award}(x)\times{}^{n-1}P_m\times(PE1)^{\wedge\wedge}\mathrm{m}/(m\times P(E1))$$

$$\mathrm{Award}(1)=\mathrm{Award}(x)\times{}^{n-1}P_m\times(PE1)^{\wedge\wedge}(m-1)/m$$

So in a many player environment:

$$P(E1)=[(P(Ex)/{}^{n-1}P_m]AA1 \qquad \text{Equation 3}$$

$$\mathrm{Award}(1)=\mathrm{Award}(x)\times{}^{n-1}P_m\times(PE1)^{\wedge\wedge}(m-1)/m \qquad \text{Equation 4}$$

Therefore an award of a super-game, a jackpot, or other second level event can be made to two players as the result of two conditional wins, rather than by using a single less probable win as is traditional.

From the above equations the probability of triggering super-games or jackpots is known while the super-games or jackpot awards themselves are indeterminate until triggered. Hence the probability to be used in triggering the jackpot is now defined by Equation 1. In the two player case, the award should be half the jackpot for the two players that achieve the event at the defined probability.

Such a scheme can also be applied to link jackpot arrangements, which in a traditional system are triggered by a particular pay.

Similarly, in a Hyperlink™ jackpot arrangement, see international patent publication no. WO 99/03078, the contents of which are herein incorporated by reference, where the jackpot is conventionally triggered by the players bet in relation to a relative range for the purpose of producing a particular probability, a cooperative Hyperlink™ jackpot arrangement can be implemented in which the bets of two players should be used within ranges defined by the probability calculated using Equation 1.

A similar process can be applied to the award of features to two players as the result of two conditional wins rather than on the basis of a single less probable win.

When awarding features in such a scenario the probability to be used in triggering the feature is should be calculated as defined by Equation 1, and the award allocated to the two players by the feature so triggered is now defined by Equation 2.

In the above embodiments the consideration of two or more players can be handled in two separate ways. The first is that conditional probability as set forth above applies to more than two players. The second is that the third player needs to be involved in a conditional win with a fourth player within the time frame, i.e. the two player version is effectively repeated.

Provisional patent application no 2005905260 in the name of Aristocrat Technologies Australia Pty Ltd, and international patent publication number WO 2007/033430, which claims priority from this provisional patent application, the contents of both of which are herein incorporated by reference, describe a system for implementing gaming services having a plurality of servers similar to the present embodiment. Those skilled in the art will readily understand that the methods of enabling inter-service described therein can be modified for application in the present embodiment.

Figure 6:
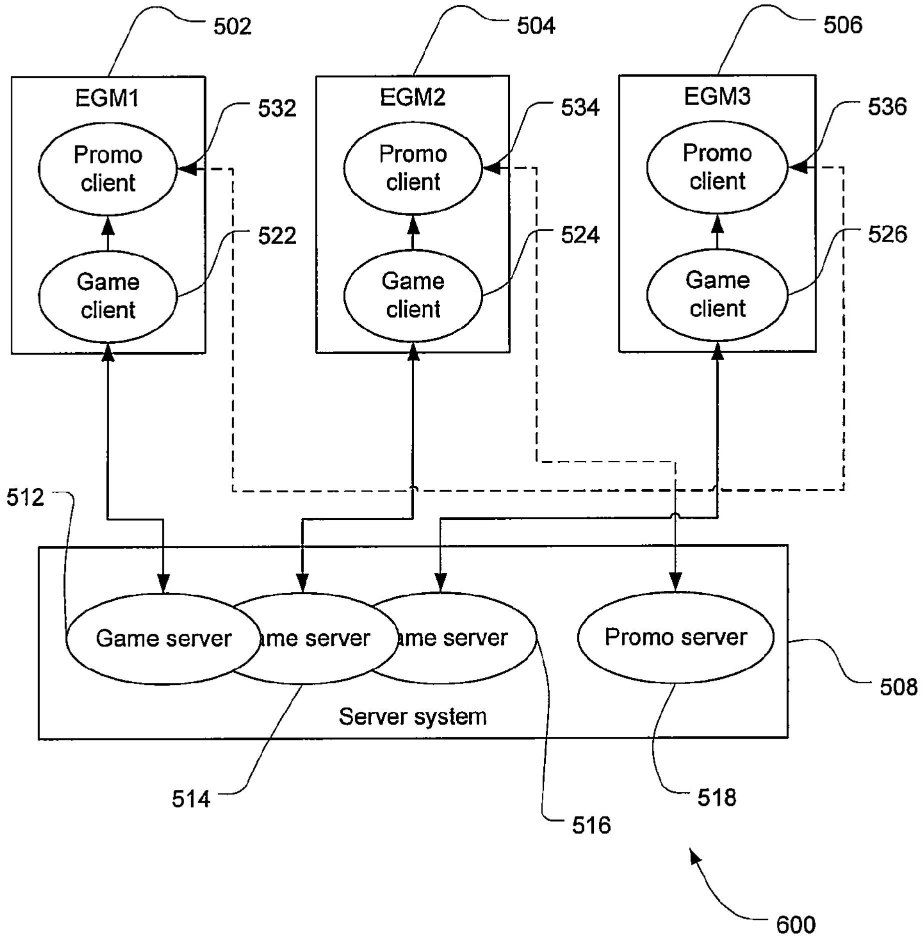
FIG. 6 shows a schematic representation of software processes and data used in a second embodiment of the present invention.

FIG. 6 depicts an alternative arrangement that may be used to implement an embodiment of the present invention. In order to simplify the description of FIG. 6 features in common with FIG. 5 have been corresponding numbered. Accordingly, the system 600 of FIG. 6 includes three gaming machines 502, 504 and 506 each of which is running a respective game client and promo client e.g. game client 522 and promo client 532 of gaming machine 502.

The chief difference between the system of FIG. 6 and that of FIG. 5, is that, in the embodiment depicted in FIG. 6 a plurality of clients operating on each gaming machine interact directly with the promotional server 518 to enable interaction between services rather than by the game servers storing events of interest in a centralised data store accessible by the promotional server. In this regard the game clients 522, 524, 526 each send events of interest and/or game data to their respective promo client 532, 534, 536, which communicates this data back to the promotional server 518 for determining whether a trigger event has occurred and a super-game should be started. The architecture of FIG. 6 is effectively an implementation of the architecture described in International Patent Application No PCT/AU2005/00836 in the name of Aristocrat Technologies Australia Pty Ltd published as WO 2005/120672, the contents of which are incorporated herein by reference and further details of the implementation of the present embodiment will be understood from this specification.

The server system 508 runs a game server process 512, 514 and 516 corresponding to each of the gaming machines 502, 504 and 506 and a promotional server 518. In this embodiment, the promotional server 518 and the game servers 512, 514 and 516 do not interact directly. Rather, each game client 522 pushes game data and events of interest to the respective promo client e.g. 532. The promo client in this embodiment then either processes this data and determines whether a trigger condition has occurred in respect of that gaming machine and then transmits that trigger and relevant data e.g. a player ID or other data received from the game client 522, back to the promotional server 518, or directly transmits all the data received from the game client 522 through to the promotional server 518. The promotional server 518 accordingly receives data from each of the promo clients 532, 534 and 536 and on that basis determines whether a trigger condition has occurred which will start a super-game. This embodiment of the present invention has the advantage that server process need not be modified from existing game servers and only minor modification to game client systems need to be performed. However, because critical game data is being transmitted from the game client to the promo client and then to the promotional server, it is necessary for the promo client to be secure.

The rest of the process for implementing embodiments of the present invention is common to both the systems of FIGS. 5 and 6 insofar as the promotional server 518 determines if a feature trigger has occurred and when a predetermined trigger condition is met according to predefined triggering rules for the super-game. The promotional server 518 identifies which gaming machines should take part in the super feature and causes the promo client on each gaming machine participating in the super feature to begin interacting with the players until the super feature is complete.

In conventional gaming systems a feature trigger or event would usually be treated as a state of an underlying game being played on each gaming machine. However, in embodiments of the present invention because the data relating to the events of interest is output from the game service (e.g. by storing it in memory accessible to other services, or by pushing it to another service) triggering can be performed outside the game process itself, which makes the possible triggering criteria much broader and flexible.

Examples of how super features can be triggered in several different circumstances will now be described. The present invention should not be construed as being limited to situations where super-games are triggered in the means described herein, rather the examples given should be treated as being illustrative only.

In a first exemplary embodiment a super-game is triggered by the promotional server 58 in response to the occurrence of certain predetermined events in game features of different types, which are being played on a plurality of gaming machines connected to the server system. For example, the purpose of such a super-game may be to link player experiences in such a way that a group of players in a gaming venue that are playing different types of games can trigger a super-game feature. In this case, the super-game feature trigger is defined by the promotional server so it will occur when each of the five different game features are triggered.

In a typical gaming network many gaming machines will offer the same game to players, but throughout the network many different games will be playable. In this case several players will be playing each type of game that has one of the features which are eligible to form part of the trigger for the super-game.

When a player triggers the feature on their game the player ID and the relevant feature data, including the type of feature triggered, is communicated to the promotional server 518 using either of the architectures described above. When each of the necessary features has been triggered the promotional server 518 will detect that the super feature has been triggered, and the super feature will be initiated. The participants in the super-game will be those players whose feature triggers have contributed to the triggering of the super-game.

In the embodiment depicted in FIG. 5 this process would take the form of the game servers being designed to store the feature triggers as "events of interest" in the data storage 538 and the promotional server monitoring the data storage 538 to determine whether the trigger data saved meets criteria for initiating a super-game.

In the embodiment of FIG. 6, the game client 522 of the gaming machine would send feature trigger event information to its respective promo client 532, 534, 536, which would then send the feature data and player ID to the promotional server 518 to determine whether the super-game has been triggered.

In certain embodiments, the promotional server 518 checks whether each of the predetermined triggers has been received, in this instance the promotional server 518 is looking for five different features to be triggered, within the gaming machine network. To make this determination the promotional server 518 will require at least, data representing the type of feature which has been triggered, and the player ID (or machine ID) in order to ascertain whether a super feature trigger has occurred and to allocate participation in the super-game to the appropriate player.

Upon determining that a super-game has been triggered the promotional server 518 identifies each of the players which has contributed to the super-game, and instructs the promo client 532, 534 and 536 of the identified players gaming machines, to begin interacting with the player to play the super-game. The promotional server 518 and the respective promo clients 532, 534 and 536 play out the super-game and attend to determining winnings or prizes awarded to each of the players.

In a second example, the super-game can be triggered by a predetermined number of game features being triggered. This embodiment is particularly useful in a situation where a plurality of gaming machine each have the same game feature. In this case, the promotional server simply counts feature triggers and when the predetermined number of features are triggered across the gaming machine network, the super-game will be initiated. As with the previous embodiment there are several implementations of this triggering process that can be implemented.

Turning firstly to FIG. 5 in this case each game server 512, 514, 516 is configured to store the data relating to a feature trigger and the player ID in the data storage 538. The promotional server 518 then interrogates the data storage 538 to determine whether a sufficient number feature triggers have occurred to trigger the super-game.

In an embodiment using the architecture of FIG. 6, the game clients 522, 524 and 526 are configured to push feature trigger data to their respective promo clients 532, 534 and 536. The promo client 532, 534 and 536 then communicate the trigger data and player ID back to the promotional server which determines whether a triggering condition for the super-game has occurred.

In both of the embodiments the promotional server 518 determines if the super-game has been triggered by determining whether the most recently received or checked feature trigger data means that sufficient triggers have occurred to begin the super-game. If the feature trigger is the last one required, for the super-game to be triggered the promotional server 518 identifies the players to take part in the super-game and instructs the promo client on each of those players' terminals to be begin interacting with the player.

As will be appreciated two triggering examples described in detail herein are only very small number of the possible ways in which super features can be triggered. Our co-pending United States utility patent application, filed on the same date as the present application and titled "Networked gaming system", the contents of which are incorporated herein by reference, describes a range of methods in which plurality of players can take part in triggering an event. The methods described therein can advantageously be applied to the present invention and be used to trigger a super-game.

Two examples of super-games that can be played will now be described in connection with FIGS. 7 and 8 of the accompanying drawings. In the examples that follow the process of triggering a super-game and "playing the game" or determining its outcome occur substantially simultaneously. In the first example, a part of the result of a game feature being played by each of the participants is used to determine the outcome of the super-game. The result or playing of this feature also forms part of the trigger of the super-game.

In this example, five players are taking part in the super-game, each of them is playing a spinning reel game. FIG. 7 represents the five gaming machines 702, 704, 706, 708, 710 of the players and depicts the reels displayed for each machine.

In this embodiment, a single reel from each player's game is used as a reel for the super-game. The display of the super-game is at 700. In one embodiment, the super-game display 700 may be shown on a top screen on each players gaming machine (or any other gaming machine which is not currently using its top-screen) or in a separate window on the main display of gaming machine or even on public display, such as plasma screen 204 of FIG. 4.

In the present embodiment, the first reel of the gaming machine 702 is used in the super-game, a second reel of gaming machine 704 is used in the super-game, and third fourth and fifth reels of gaming machines 706, 708 and 710 respectively, are used for the super-game. Accordingly, the super-game depicted at 700 is a spinning reel game with five reels. If each of the gaming machines 702-710 are playing the same game feature then the super-game 700 will use the paytable as each of the standard games. Alternatively, if each of the gaming machines 702-710 play different features then a special super-game paytable will be used to determine the result of the super-game.

In the present example, because the result of the super-game relies in part on the result of the underlying games of each of the participating players (i.e. the final reel position of the single reel of each player's gaming machines) there are synchronization problems which may occur in this super-game which must be addressed. For example, it may be possible for a group of players to each sit on a win or game result which will contribute to the triggering of a super-game until a sufficient number of other players achieve such results that super-game is triggered. To prevent this it is necessary to define clearly the eligibility requirements for participating in a super-game trigger. In this case, a super-game will include a single reel from five gaming machines which have an outcome that qualifies it to trigger a super-game, and which occur in the closest proximity in time to each other. Also, a single reel can only be used in one super-game. However, a player may participate in a number of super-games using different reels from their gaming machine.

Accordingly, since each gaming machine 702-710 has five reel strips the player may participate in up to six games at once, namely their underlying game and five super-games.

In some embodiments it may be possible to allow players to select which of their reels is used in the super-game. In this case it will be necessary to have rules which handle issues caused by the different reel strips selected by players, and different games configurations. These will typically be accounted for in the paytables used for the super-game or by constraining the combinations that are allowable.

A super-game of the type described above can be implemented in a number of possible ways. Most preferably the super-game is implemented in accordance with the embodiment of FIG. 6 of the accompanying drawings. In this situation that each game client will push its reel positions to the respective promo client, which will in turn send the reel positions to the promotional server along with the terminal ID and possibly player ID. The promotional server will then determine, on the basis of the five sets of reel positions reported, the outcome of the super-game.

Figure 7:
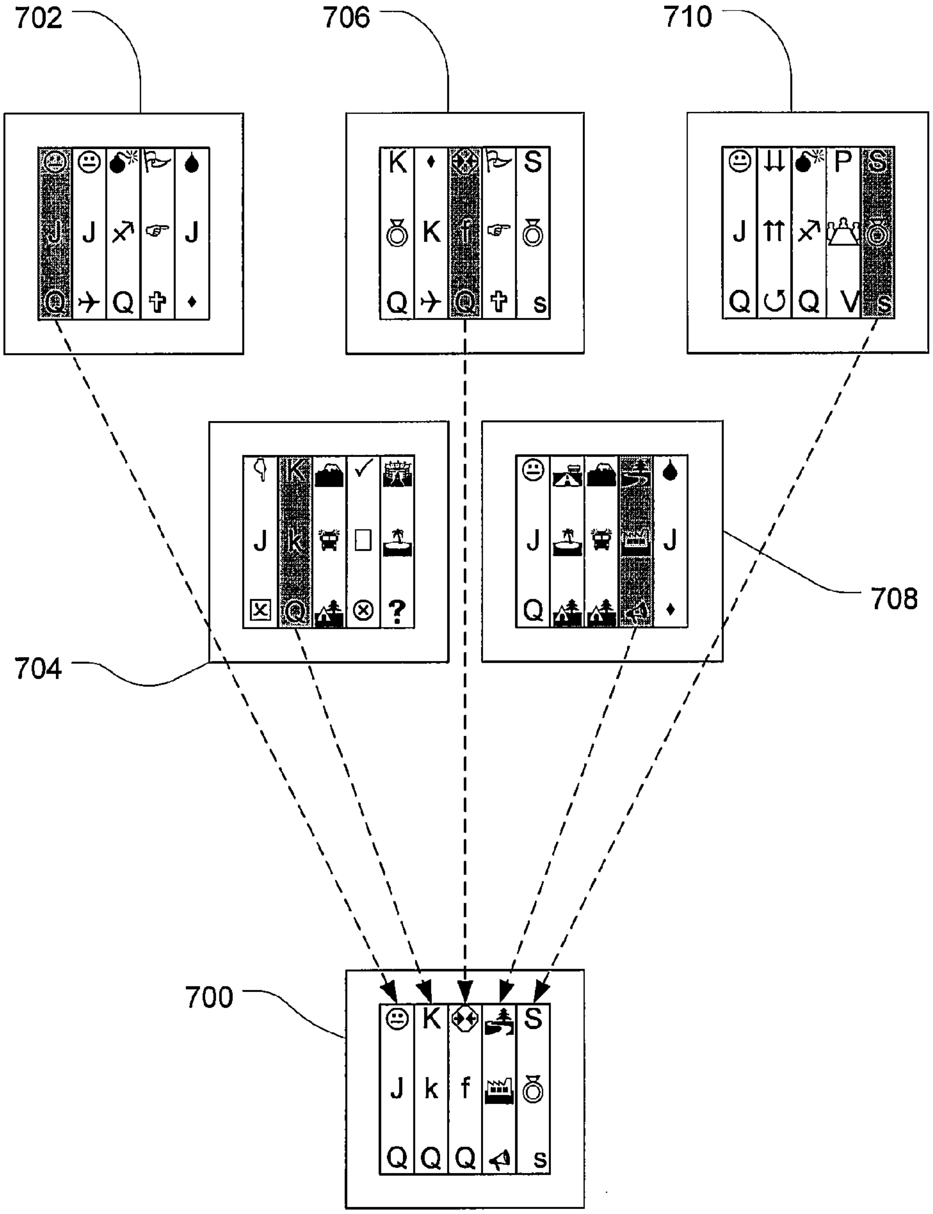
FIG. 7 shows schematically a game run in accordance with an embodiment of the present invention.

Using the architecture of FIG. 5, the super-game depicted in FIG. 7 can be implemented by each of the game servers of the participating gaming machines 502-510 writing their reel positions and terminal ID the game data storage 538. The promo game server 518 can interrogate the data storage 538 and determine the final reel position of each of the required reels.

From here onward both embodiments operate in the same by the promotional server 518 determining the outcome of the super-game and making a pay out to each of the players. However, it should be noted that at the point in time when the outcome of the super-game is determined i.e. the time at which the last of the underlying game features on the gaming machines 702-710 is completed, it is likely that the game services running the underlying games on the gaming machines will have already made a payout on the outcome of those underlying games. This is not so much of a problem in the present embodiment, as the win in the super-game is an additional win and the payout has no bearing on the payout on the underlying game. Each of the participants in the super-game is allocated a portion of the winnings from the super-game and the promotional server instructs the promo client of each of the players' terminals to interact with the player and deliver their portion of the win.

Figure 8:
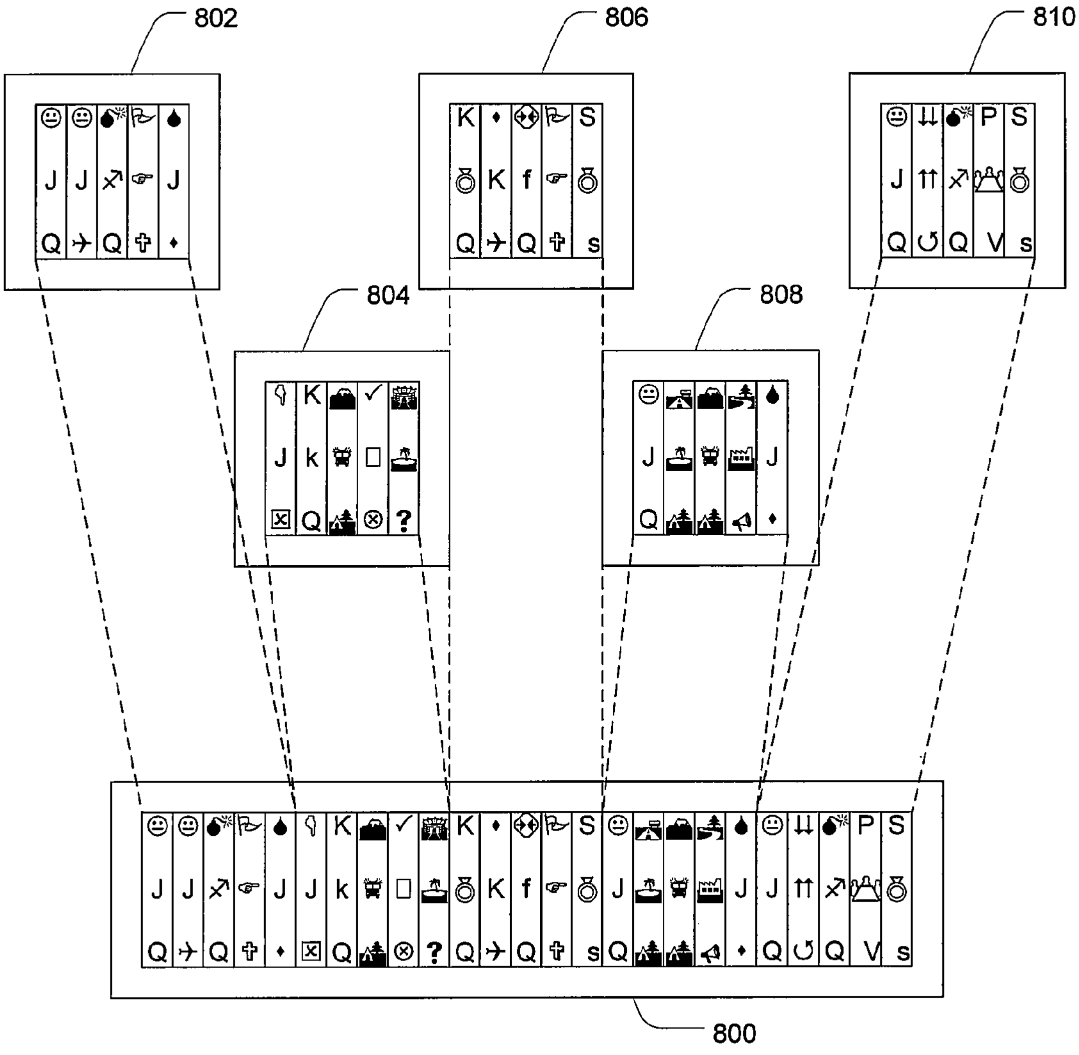
FIG. 8 shows schematically a game according to an alternative embodiment of the present invention.

FIG. 8 depicts an alternative form of super-game in which all of the reels of the participating gaming machines form part of the super-game. In FIG. 8 the reel displays of games on five gaming machines 802, 804, 806, 808 and 810 are depicted. The super-game is illustrated in display 800, and includes 25 reels. Because a twenty five reel game is being played, the outcome of the game is determined by an entirely new play table and payout structure.

In practice, because the super-game has so many reels it is likely in this case that the super-game will be displayed on the display 204, suitably a plasma screen, of the gaming network 200 or other auxiliary screen rather than on a display on individual gaming machines.

A super-game operating according to this embodiment can be implemented in a range of ways. Firstly, using the architecture described in connection with FIG. 5 a super-game of the type depicted in FIG. 8 is implemented by each of the game servers storing the outcome of its particular game feature, including the reel positions of each of the reel and player ID in the data storage 538. The promotional server then interrogates data storage 538 to ascertain the reel positions of all twenty five reels stored in the data store.

Using the architecture described in connection with FIG. 6 the game client of each participating machine will report its reel positions to the promo client, which will transmit that data along with terminal ID to the promotional server.

For both implementations described above the promotional server then checks the reel positions of the super-game and determined the outcome of the super-game against its internal pay table.

If the super-game is going to be made to comply with the "highest win is paid" rule instead of the previously described embodiment where a prize from the super-game is paid in addition to any prize paid as a result of the underlying game provided by the game services provided by the game clients 522, 524, 526, then it will be necessary for the promotional server 518 to also determine whether the outcome of the super-game or the outcome of the underlying game played by each of the gaming machines should be paid. In doing so the promotional server 518 may determine the payout from the super-game and compare that with the payout from the underlying game, which may be stored locally at the promotional server 518 or communicated from the game clients 522, 524, 526, and if it is necessary for the super-game to make additional payout to the player (i.e. the super-game payout is the best) the promo client corresponding to the player's gaming machine is notified and the additional payout amount is delivered.

Using the architecture described in connection with FIG. 5 or 6 it is also possible to implement a new and interesting entertainment feature for delivery to players and other people around the gaming establishment. Because the game servers or client processes are modified to store or transmit events or game data of interest it is possible to store and use this data to replay particularly unusual or large wins at a later time. This replay feature can be used to increase the interest of players and spectators.

In order to perform this task the promotional server can be configured to interrogate the stored data in the data storage 538 and replay selected game events. For example, the promotional server may be configured to determine special game events such as particular wins, double up wins and jackpot awards and replay these on an auxiliary display system in the gaming network. In this regard, the promotional server will identify the most significant outcome in a predetermined time period and replay these until the next time period elapses, when the promotional server identifies the most significant outcome in that time period for replay. In a preferred form the promotional server will also interact with the promo client of each gaming machine to replay the stored replays on either of the top screen or the secondary display window of the gaming machine in order to increase player interest. Using the architecture of FIG. 6 the game clients can be configured to push the results of interest or events of interest to the promo client on their respective gaming machine which then transmits this data to the promotional server. The promotional server can then be configured to store this data in a memory location for replay at a later time.

As can be seen from the foregoing, games that allow player to player interactivity can 25 allow players to form alliances to compete for prizes, for which they may be ineligible to win on their own.

In the previous embodiments described herein the triggering events to cause a super-game to be initiated may require a specific trigger event to occur in respect of a plurality of different gaming machine. These plurality of specific triggering events may be the same or different, depending on the criteria set for the promo client. However in some embodiments it may be desirable to enable players to have more input into the participants of the super-game. In one embodiment, this may be achieved by allowing the player to buy into the super-game as a side bet. In another embodiment, a super-game may be awarded and the player given the ability to pick the other participants upon the fulfillment of a predetermined criterion (i.e. a trigger condition). It may also be possible to allow players to form a team before triggering the super-game and if it is triggered by any members of the team the whole team takes part.

Our co-pending Australian provisional application number 2006902578 titled "Networked gaming system" mentioned above and incorporated herein by reference, describes a suitable system for enabling player negotiation and team formation which is applicable to certain embodiments of the present invention.

It may additionally be advantageous to allow communication between players to enable them to interact using the gaming system to form teams, negotiate terms for their cooperation, to arrange strategy or just for non-game related or entertainment purposes.

In a first embodiment the communication between players will be managed by the promotional server 518 and the promotional clients 532, 534, 536, which are resident on each players gaming machine.

The communications may take the form of messages typed by players into their terminal, but other forms of communication are also possible. For example, because the promotional server 518 has access to stored game data, or at least has game data sent to it via the promo client, it is possible for players to communicate with other players to replay to them a win they just experienced.

Other more complex forms of communication are also possible. For example the system can be configured to allow players to transfer funds to each other. In this case a separate communication server will preferably be used.

The communications server is configured to receive, process and respond to requests from the player as described below.

Take, for example a situation where Player 1 wishes to contact and communicate to player 2.

Firstly, Player 1 selects an icon on their display producing a menu. The menu offers a range of communication options e.g. transferring money or displaying a win to another player or other communication.

From this menu Player 1 selects the appropriate request. At the gaming machine, a separate process, possibly a client process, is generated to interact with the player to generate the appropriate request, including specifying the destination/recipient of the communication. Optionally the player may be provided with a list identifying who is available for contact.

The communications process sends the request to the communication server. The communication server processes the request, include error checking, validation and authorization checking. The communication server identifies the intended recipient for the communication and the terminal where the recipient resides. The communication server then forwards the request to the destination.

A message is then generated on the recipient's machine by the local communication process running on that machine. The recipient has the option of responding. If the recipient 10 wishes to respond, a suitable interface will be generated for enabling a response.

It is possible in a yes/no scenario that a simple button pair may appear on the touchscreen or two buttons may be designated. Alternatively the recipient may need to interact with a menu or other more complex input output interface such as a keypad, or keyboard or the like. An example would be a transfer of money as described above which may require an alphanumeric keypad to enter an amount.

The recipient's response is formatted and sent back to the requestor via the communication server. The communication server will first identify whether the original requestor is still at the original location so that the correct person receives the communication.

Communication could be handled by a peer to peer transmission rather than using a server as a communications router. In this case, when the original request is forwarded to the recipient, the requestor's location may be encoded in the request. Hence when the recipient responds it need not be transmitted to the communication server. However in this embodiment a problem will arise if the player has left the original location.

The communication server can provide a broadcast (e.g. to send a broadcast to all players 25 to ask if anyone found a lost item or to seek participants in a team game etc.) or multicast function (e.g. to organise a rendezvous between friends).

While the foregoing description has been provided by way of example of the preferred embodiments of the present invention as presently contemplated, which utilise gaming apparatus and machines, those skilled in the relevant arts will appreciate that certain embodiments of the present invention also may have application to internet gaming and/or have application to gaming over a telecommunications network, where handsets are used to display game outcomes and receive player inputs.

Where in the foregoing description reference has been made to integers having known equivalents, then those equivalents are hereby incorporated herein as if individually set forth.

Those skilled in the relevant arts will appreciate that modifications and additions to the embodiments of the present invention may be made without departing from the scope of the present invention.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A gaming network comprising:

a plurality of gaming machines, each one of the gaming machines being arranged to run a game client process and a promotional client process;

a game server that is remote to the gaming machines, the game server being arranged to run a plurality of separate game server processes, the game client process of each of the gaming machines is arranged to communicate with a unique one of the game server processes, via a communication network, such that each of the gaming machines receives an individual game service, the game client of each of the gaming machines being further arranged to communicate event data, via the communication network, resulting through play of an individual game on the respective one of the gaming machines to a common data storage module that is remote to the gaming machines for storage; and a promotional server configured to evaluate the event data stored in the common data storage module and predefined trigger data in order to determine whether to initiate a shared game service such that upon determining that the shared gaming service is to be initiated the promotional server communicates with the promotional clients, via the communication network, for selected ones of the gaming machines in order to implement the shared gaming services; and wherein the shared gaming service includes play of a shared game in which the plurality of gaming machines participate, the play of the shared game being conducted substantially simultaneously with play of each individual game on each of the respective plurality of gaming machines.

2. A gaming network as claimed in claim 1, wherein the game client pushes the event data to the corresponding promotional client which in turn communicates the event data to the common data storage module.

3. A gaming network as claimed in claim 1, wherein the event data is communicated by the game client in response to a trigger related outcome occurring in the game, Such that the selection of gaming machines participating in the shared gaming service is based on the communicated event data.

4. A gaming network as claimed in claim 3, wherein the trigger related outcome is specific to the game played on the associated gaming machine.

5. A gaming network as claimed in claim 1, wherein the promotional server is configured to periodically evaluate the event data.

6. A gaming network as claimed in claim 1, wherein the event data comprises data relating to one or more outcomes of the game played on the associated gaming machine.

7. A gaming network as claimed in claim 6, wherein the shared gaming service is a linked game event in which the selected gaming machines are eligible to be awarded a prize.

8. A gaming network as claimed in claim 7, wherein an outcome of the linked game event is based, at least in part, on the individual game outcomes derived from the event data.

9. A gaming network as claimed in claim 8, wherein the games played on the respective gaming machines are spinning reel games and wherein the outcome of the linked game event is based on the outcome of at least one reel from each of the selected gaming machines.

10. A method of operating a gaming network comprising a common storage module, game server, a promotional server and plurality of gaming machines implementing both a game client and a promotional client, the method comprising:

the gamer server:

running a plurality of separate game server processes;

for each gaming machine:

enabling communication between the game client and a unique one of the game server processes via a communication network;

playing an individual game;

communicating event data resulting through playing of the individual game to the common storage module, for subsequent storage;

implementing an evaluation process in the promotional server which evaluates both the event data stored in the common storage module and predefined trigger data in order to determine whether to initiate a shared game service;

upon determining that the shared gaming service is to be initiated enabling communication between promotional clients for selected ones of the gaming machines and the promotional server via the communication network in order to implement the shared gaming service; and initiating the shared gaming service including playing a shared game in which the plurality of gaming machines participate, playing the shared game includes conducting substantially simultaneously with playing each individual game on each of the respective plurality of gaming machines.

11. A method as claimed in claim 10, wherein the step of communicating the event data comprises the game client pushing the event data to the corresponding promotional client which in turn communicates the event data to the common data storage module.

12. A method as claimed in claim 10, wherein the event data is communication by the game client in response to a trigger related outcome occurring in the game, such that the selection of gaming machines participating in the shared gaming service is based on the communicated event data.

13. A method as claimed in claim 12, wherein the trigger related outcome is specific to the game played on the associated gaming machine.

14. A method as claimed in claim 10, wherein the event data comprises data relating to one or more outcomes of the game played on the associated gaming machines.

15. A method as claimed in claim 14, wherein the shared gaming service is a linked game event in which the selected gaming machines are eligible to be awarded a prize.

16. A method as claimed in claim 15, wherein an outcome of the linked game event is based, at least in part, on the individual game outcomes derived from the event data.

17. A method as claimed in claim 16, wherein the games played on the respective gaming machines are spinning reel games and wherein the outcome of the linked game event is based on the outcome of at least one reel from each of the selected gaming machines.

* * * * *